Jan. 31, 1961 H. HORLACHER 2,969,808
TWO-STAGE VALVE
Filed May 22, 1958 3 Sheets-Sheet 3

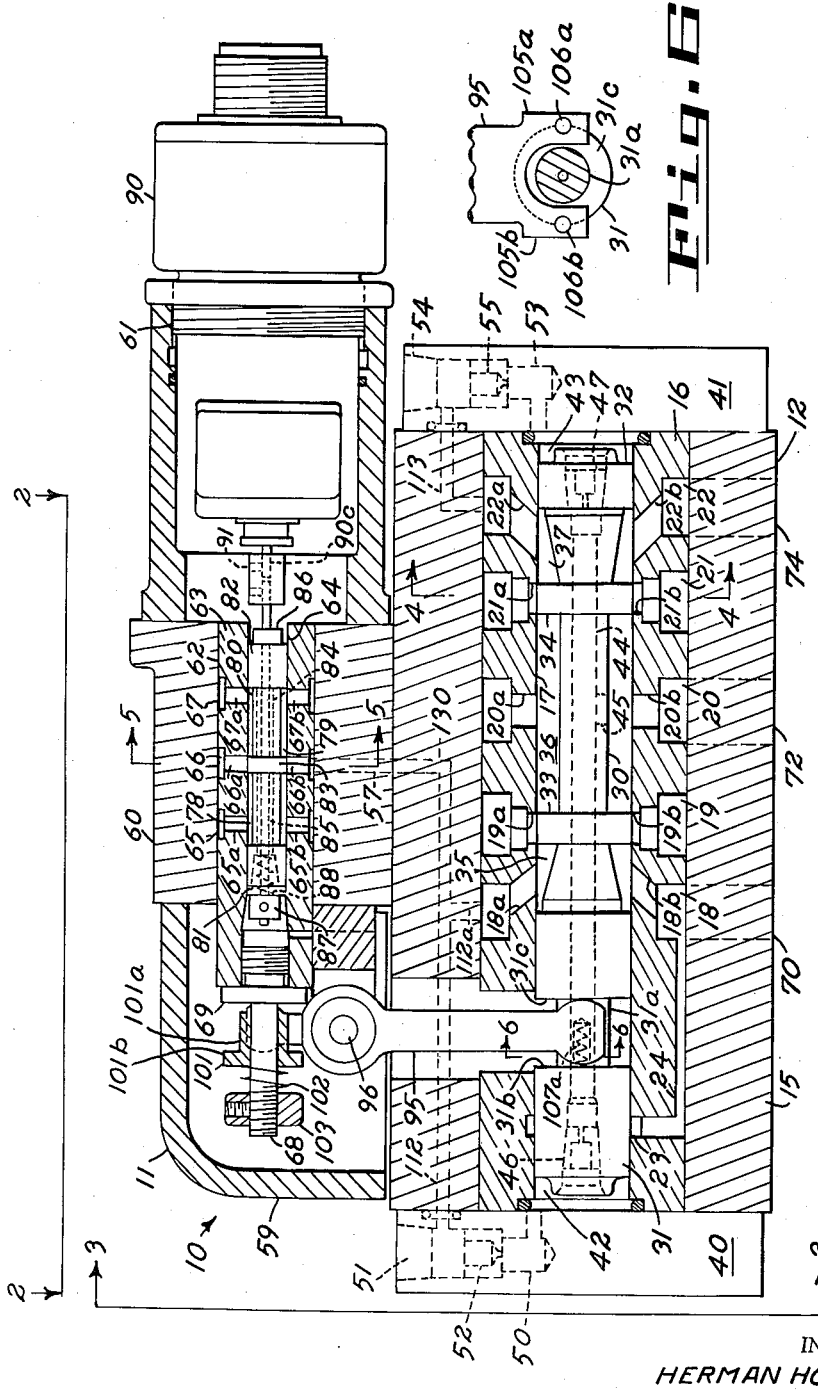

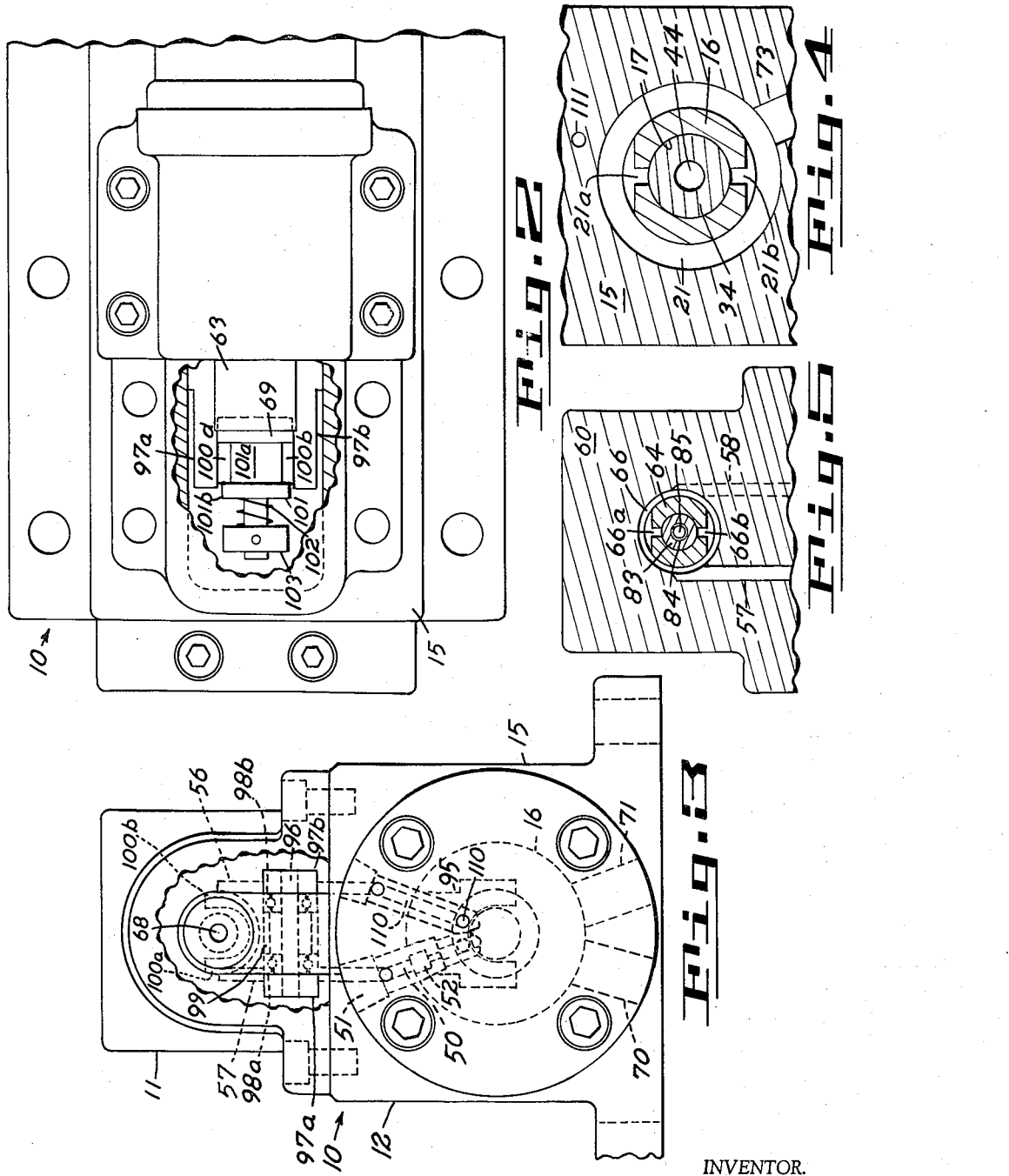

INVENTOR.
HERMAN HORLACHER.
BY
ATTORNEYS.

United States Patent Office 2,969,808
Patented Jan. 31, 1961

2,969,808
TWO-STAGE VALVE
Herman Horlacher, Cincinnati, Ohio, assignor to The Cincinnati Milling Machine Co., Cincinnati, Ohio, a corporation of Ohio
Filed May 22, 1958, Ser. No. 737,119
5 Claims. (Cl. 137—622)

This invention relates to two-stage valves.

In many machine tool applications it is necessary to operate a device such as a hydraulic motor or a hydraulically actuated piston, in response to a relatively weak control force such as one produced electromagnetically in response to a control signal. In the present invention an improved two-stage valve of novel construction, particularly suited to such applications, is provided which operates by a pressure drop rather than a pressure build up.

In brief, in the preferred embodiment of the invention, the main stage of the valve has two chambers, each connected to the source of pressure and the pilot stage of the valve, and each having a discharge passage. Equal resistances are located between the source and each chamber, and equal resistances are located in the discharge passages from each chamber. The pilot stage of the valve has a discharge opening and operates alternately to close the discharge opening, to connect one chamber to the discharge opening, or to connect the other chamber to the discharge opening. When the pilot stage discharge is closed, the resistances associated with the chambers in the main stage maintain the pressures in the chambers equal and substantially below the source pressure but above discharge pressure. When the pilot stage is actuated by the control force one of the chambers is connected to the discharge opening in the pilot stage, producing an additional discharge path for that chamber, and reducing the pressure therein, thereby producing a pressure differential between the chambers. The main stage of the valve, which is connected to the source of pressure and the device to be operated, is actuated to move the plunger thereof by this pressure differential and to operate the device. Preferably, the pilot stage is linked to the main stage, and the discharge opening therein is closed in response to movement of the main stage plunger to again equalize the pressures in the chambers and stop movement of the plunger. The main stage plunger remains in the same position until the pilot stage is again actuated by a force acting in the same or the opposite direction from the original actuating force.

With this construction a stable, sensitive valve having the desired response is provided. The sensitivity of many two-stage valves is impaired by forces within the pilot stage associated with high pressure therein. The present valve, however, may be operated with a pressure in the pilot stage substantially below the source pressure. In some valves the sensitivity and the stability of the valve is reduced by a spring restoring force in the main stage which causes oscillation of the valve member before it comes to rest in its normal position. In the valve disclosed herein no spring restoring force need be utilized in the main stage. In many valves the response of the valve is established by the design thereof but the response of the present valve can be quickly and inexpensively altered as desired by changing the resistances associated with the main stages chambers.

It is, therefore, a general object of the present invention to provide a two-stage valve capable of operation in response to a relatively weak control force.

It is still another object of the present invention to provide a two-stage valve in which the pressure in the pilot stage remains substantially below pressure from the source.

It is an additional object of the present invention to provide a two-stage valve in which pressure from the source is connected to the device to be operated in response to a pressure drop in the main stage.

It is a further object of the present invention to provide a two-stage valve in which the main stage is operated by a pressure drop therein due to discharge through the pilot stage, and said discharge is terminated in response to operation of the main stage.

It is another object of the present invention to provide a simple, effective, sensitive two-stage valve which is positive acting and stable in its operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings:

Fig. 1 is an elevational view in cross-section showing the valve of the present invention;

Fig. 2 is a view through section 2—2 of Fig. 1;

Fig. 3 is a view through section 3—3 of Fig. 1;

Fig. 4 is a view through section 4—4 of Fig. 1;

Fig. 5 is a view through section 5—5 of Fig. 1;

Fig. 6 is a view through section 6—6 of Fig. 1;

Figure 8A:
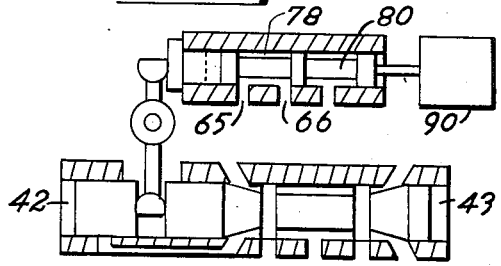
Fig. 8a is a schematic diagram showing the relative position of the parts of the valve at the time the pilot plunger is initially moved from its normal position, shown in dotted lines, in response to a control force exerted thereon, the amount of movement shown being exaggerated for clarity.
Figure 8B:
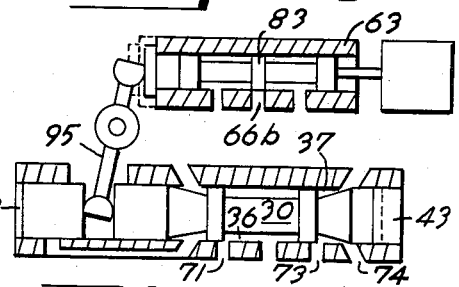
Fig. 8b is a schematic diagram showing the relative position of the parts of the valve at the time the main plunger and the pilot sleeve are moved from their normal positions, shown in dotted lines, in response to a pressure drop in the left hand chamber, the amount of movement shown being exaggerated for clarity.
Figure 8C:
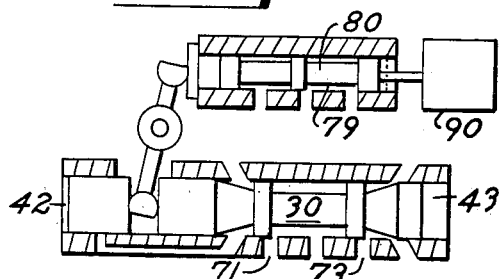
Figure 8D:
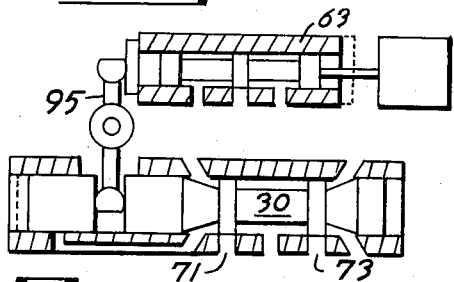

Fig. 8c is a schematic diagram showing the relative position of the parts of the valve at the time the pilot plunger is initially moved from its position of Figs. 8a and 8b, shown in dotted lines, to its normal position in response to a control force acting in the opposite direction of the control force of Fig. 8a, the amount of movement shown being exaggerated for clarity; and Fig. 8d is a schematic diagram showing the relative position of the parts of the valve at the time the main plunger and pilot sleeve are moved from their positions of Figs. 8b and 8c, shown in dotted lines, to their normal positions, in response to a drop in pressure in the right hand chamber, the amount of movement shown being exaggerated for clarity.

The valve of the present invention, as shown generally at 10 in Figs. 1, 2, and 3, has a pilot stage 11 and a main stage 12. The main stage has a body 15 of generally rectangular conformation, as shown in Fig. 3, with a cylindrical bushing 16 snugly received therein to form an integral part thereof. The bushing 16 has a central bore 17 and longitudinally spaced annular grooves 18, 19, 20, 21, and 22 on the external surface thereof as shown in Figs. 1 and 4. Opposed pairs of passages 18a—18b, 19a—19b, 20a—20b, 21a—21b, and 22a—22b, connect the grooves 18, 19, 20, 21 and 22 respectively to the central bore 17 of the bushing. The bushing 16 also has an internal annular groove 23 in communication with bore 17 and connected to groove 18 through passage 24 in the bushing.

The bore 17 of bushing 16 slidably receives a plunger 30 having end spools 31 and 32 which, when the plunger is in a normal or neutral position as shown in Fig. 1, lie between the ends of the bushing 16 and the end pairs of passages 18a—18b and 22a—22b where they connect to the bore 17. The plunger 30 has two intermediate spools 33 and 34 which are aligned with and block, respectively, the opposed passages 19a—19b, and the opposed passages 21a—21b, when the plunger is in its normal position of Fig. 1. The spools on the plunger are longitudinally spaced to define annular passages between the plunger 30 and the inner wall of the bushing 16, passage 35 extending between spools 31 and 33, passage 36 extending between spools 33 and 34, and passage 37 extending between spools 34 and 32. The body 15 has staggered openings 70, 71 (see Fig. 3), 72, 73 (see Fig. 4), and 74 extending from the grooves 18, 19, 20, 21 and 22, respectively, to the external surface of the body 15.

Circular end plates 40 and 41 connect to the ends of the body 15 and close the ends of the bushing 16 which are flush with the ends of the body. The end plates and the end spools of the plunger 30 define chambers 42 and 43 in the ends of the bore 17.

The plunger 30 has a central longitudinal passage 44 extending therethrough and communicating with the annular passage 36 by passage 45. The passage 44, which communicates with each of the chambers 42 and 43 to define discharge passages from the source into the chambers, has restriction plugs 46 and 47, the plug 46 defining a pressure dropping resistance in the passage 44 between the source and the chamber 42 and the plug 47 defining a pressure dropping resistance in the passage 44 between the source and the chamber 43.

The circular end plate 40 has a passage 50 extending from the chamber 42 through the plate to the plug 51 on the periphery of the plate to define a portion of the discharge passage from the chamber. A restriction plug 52 is received in this passage and defines a pressure dropping resistance between the chamber 42 and discharge. A similar passage 53 having end plug 54, passes through the plate 41 from the chamber 43 and contains a similar restriction plug 55.

The pilot stage 11 has a casing 59 having a central body portion 60 forming an integral part thereof and having an opening 61 at one end. The central body portion 60 has a cylindrical bore 62 extending therethrough which slidably receives a sleeve 63 also having a central bore 64. The sleeve 63 has longitudinally spaced annular grooves 65, 66, and 67 on the external surface thereof, each of which is connected to the sleeve bore 64 by an opposed pair of passages 65a—65b, 66a—66b, and 67a—67b, respectively. The body portion 60 has passages 56 (Fig. 3), 57, and 58 (Fig. 5) which are spaced longitudinally to align with the grooves 65, 66, and 67 respectively, the passages 56 and 58 connecting, respectively, to grooves 65 and 67 on one side of body 60 and the passage 57 connecting to groove 66 on the opposite side of body 60. It will be noted that the grooves 65, 66, and 67 are wider than the passages 56, 57, and 58, so that the grooves will align with the passages not only when the sleeve is in the normal, or neutral, position as shown but also when the sleeve is moved during the operation of the valve. The sleeve threadedly receives a shaft 68 extending outwardly from the sleeve and having a collar 69 abutting against the end of the sleeve as shown in Fig. 1.

The sleeve bore 64 slidably receives a plunger 80 having end spools 81 and 82 and an intermediate spool 83. The spaced spools define annular passages therebetween, between the plunger and the inner wall of the sleeve, the passage 78 being defined by spools 81 and 83 and the passage 79 being defined by spools 83 and 82. When the valve plunger and sleeve are in the normal or neutral position the intermediate spool 83 is aligned with the opposed passages 66a—66b to block or close the same while the end spools 81 and 82 lie outboard of the end pairs of passages 65a—65b and 67a—67b. It should be noted that with this construction the spacing of the end spools from each other or from the intermediate spool is not critical, it only being necessary that the end spools be spaced so that the passages 66a—66b can be connected to passages 65a—65b, or, alternately, passages 67a—67b when the plunger 80 is shifted to the right or to the left, respectively, in relation to the sleeve.

The plunger 80 has a central bore 84 which loosely receives a shaft 85. A shaft 85 has a fixed collar 86 at one end abutting the end spool 82 and a fixed collar 87 at the opposite end spaced from the end spool 81. A spring 88 is carried on the shaft 85 between the collar 87 and the end spool 81 and is received in spool 81 to hold the shaft 85 fixed longitudinally in relation to the plunger 80 but to allow it slight movement within the bore 84 to align itself with the control force which is applied to it.

Figure 7:
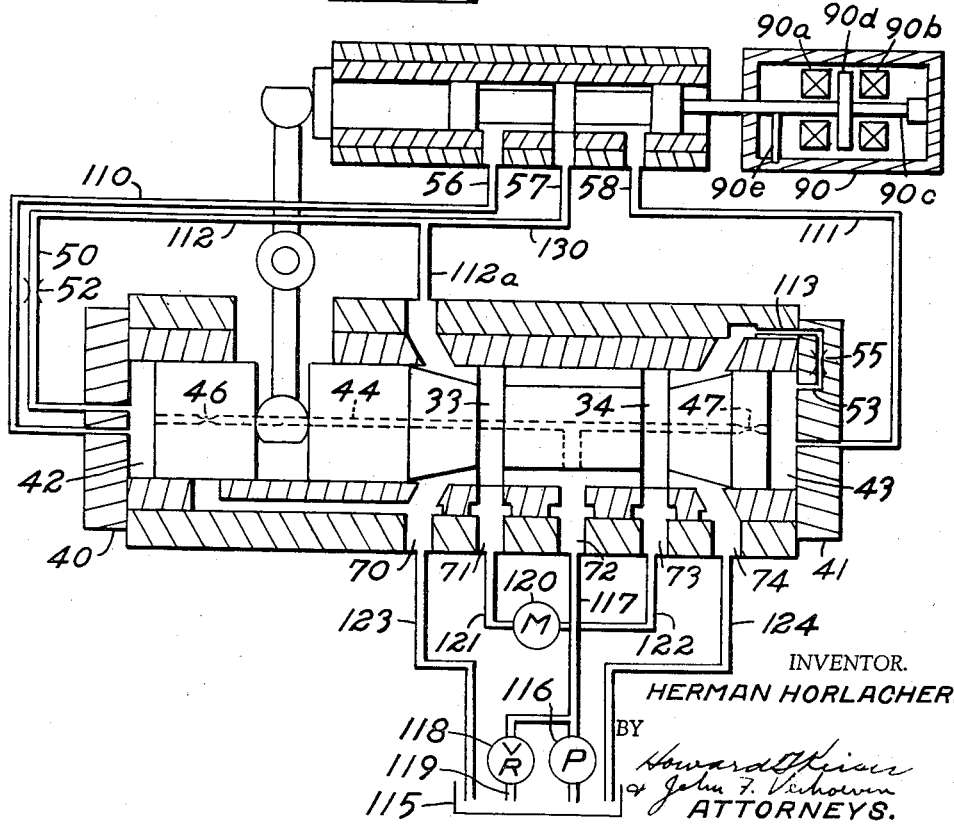
Fig. 7 is a schematic diagram of the valve of Fig. 1 as connected to operate a device and showing the movable parts of the valve in a normal, or neutral position.

An electro-mechanical transducer 90, operable to produce a control force in response to electric signals transmitted thereto, is received in the opening 61 of the pilot stage casing 59. As shown in Fig. 7, the transducer may, for example, have a pair of spaced coils 90a and 90b, a longitudinally movable shaft 90c, and a slug 90d mounted on the shaft between the coils for movement in response to current received in the coil, said currents defining a control signal. A centering leaf spring 90e mounted in the casing and connected to the shaft 90c centers the slug 90d in relation to the coils 90a and 90b in the absence of a control signal. The shaft 90c is connected by connector 91 to the shaft 85 for movement of the plunger 80 in response to the control force produced in the transducer device 90.

The plunger 30 of the main stage 12 and the sleeve 63 of the pilot stage 11 are connected by link 95. The link 95 swings around a fulcrum defined by pin 96 which is supported by spaced arms 97a and 97b extending from the body 60 of the pilot stage as shown in Figs. 1, 2, and 3. As shown in Fig. 3, the pin 96, between the arms 97a and 97b, carries ball bearings 98a and 98b held in spaced relation by sleeve 99. The link 95 is snugly received on the ball bearings 98a and 98b and the sleeve 99 and at its upper end has clevis arms 100a and 100b which straddle the shaft 68. A cap 101 which is slidably received on shaft 68 has a body portion 101a which fits between the clevis arms 100a and 100b and a head portion 101b which engages those arms. The cap 101 is urged toward the pilot sleeve 63 by spring 102 encircling the shaft 68 and held by the collar 103 which is fixed on the shaft 68 in spaced relation to the cap 101. Thus, the clevis arms of the link 95 are urged against the collar 69 to eliminate lost motion between the link 95 and the sleeve 63.

The end spool 31 of the main stage plunger 30 has a reduced portion 31a defining shoulders 31b and 31c as shown in Fig. 1. The link 95 at the end opposite the clevis arms 100a and 100b, has clevis arms 105a and 105b which straddle the reduced portion 31a between the shoulders 31b and 31c as shown best in Figs. 1 and 6. Each arm has a blind hole 106a and 106b, respectively, which receives springs 107a and 107b. The springs bear against shoulder 31b and urge the arms 105a and 105b of the link 95 into firm engagement with the shoulder 31c to eliminate lost motion between the link 95 and the main stage plunger 30.

The body 60 of the pilot stage 11 is connected to the body 15 of the main stage 12. A passage 110 in the body 15 extends from the passage 56 in the body of the pilot stage to the circular end plate 40 and through the end plate 40 to the chamber 42 as shown in Fig. 3. A similar passage 111 extends from the passage 58 through the end plate 41 to the chamber 43 (see Fig. 7). The passage 112 extends from passage 50, in the circular end plate 40, to passage 112a connected to groove 18 to define a restricted discharge passage from the chamber 42. The passage 57 in the pilot stage connects to passage 130 which, in turn, connects to passage 112a to define an unrestricted discharge path from the discharge opening defined by passage 57 in the pilot stage. In the main stage of the valve the groove 22 is connected by passage 113 to passage 53 in end plate 41 to define a restricted discharge path from the chamber 43.

The two-stage valve of the present invention may be utilized in a hydraulic system such as the one shown in Fig. 7, to control a device such as a hydraulic motor. Fluid under pressure is supplied from reservoir 115 through pump 116 to a pressure inlet port defined by passage 72 of the body of the main stage through the conduit 117. A pressure relief valve 118 is provided in line 119 which is connected between line 117 and the reservoir 115. The hydraulic motor 120 is connected by conduit 121 and 122 to the openings defined by passages 71 and 73 respectively in the body of the main stage, one of said openings constituting a pressure outlet port. The passages 70 and 74 in the main stage body 15 define discharge openings which are connected to discharge through conduits 123 and 124.

The movable parts of the valve are shown in Fig. 7 in their normal or neutral positions. At this time no control force is exerted by the transducer 90. Fluid under pressure is supplied through conduit 117, passage 72, groove 20, passages 20a and 20b, annular passage 36, passage 45, passage 44, and into chambers 42 and 43. From the chamber 42 fluid is discharged through passage 50, passage 112, passage 112a, groove 18, passage 70, and conduit 123. Similarly, fluid is discharged from chamber 43 through passage 53, passage 113, groove 22, passage 74, and conduit 124. At this time the spools 33 and 34 of the main stage plunger block the passages 71 and 73 so no fluid flows through conduits 121 and 122, and the device 120 is not operating. The restrictions 46 and 47 define pressure dropping resistances which produce pressures in chambers 42 and 43 substantially below the supply pressure. The pressure in chambers 42 and 43, however, because of restrictions 52 and 55, will be above the low discharge pressure at reservoir 115. If, for example, the restrictions 52 and 55 in the passages from the chambers 42 and 43 are of equal size to restrictions 46 and 47, and the discharge pressure at reservoir 115 is near zero, the pressure in the chambers 42 and 43 will be approximately one-half the supply pressure. Therefore, pressure in the pilot stage, since the pilot stage is in communication with the chambers 42 and 43, will also be substantially below the supply pressure. Throughout the operation of the valve the pressure in the chambers 42 and 43, and hence the pressure in the pilot stage, does not rise above this pressure.

When a control force is generated in the transducer 90 in response to a signal, the force, which may be relatively weak, is transmitted to the plunger 80 to move the plunger, for example, to the right from the neutral position shown in dotted lines to the position shown in solid lines in Fig. 8a. This connects grooves 65 and 66 through the annular passage 78 to connect the chamber 42 to discharge through the pilot stage. This additional path to discharge from chamber 42, a path which contains no restriction, lowers the pressure in the chamber while the pressure in the opposite chamber 43 remains unaffected. As shown in Fig. 8b, this shifts the main plunger 30 to the left from its neutral position shown in dotted lines to the position shown in solid lines. This opens the passages 71 and 73 connecting the source of pressure to the conduit 121 through the annular passage 36 and connects conduit 122 to discharge through annular passage 37, passage 74, and conduit 124 to begin operation of the device. At the same time, the sleeve 63 of the pilot stage is moved to the right from its neutral position shown in dotted lines to the position shown in solid lines by the movement of the main stage plunger acting through the link 95. This moves the sleeve passages 66a and 66b back into alignment with spool 83 of plunger 80, the same relationship between plunger and sleeve as when the valve was in the neutral position of Fig. 7, to close the pilot stage discharge passage or opening 57. This reestablishes equal pressure in the chambers 42 and 43 by raising the pressure in chamber 42 to its original pressure and stops movement of the main stage plunger 30. If the signal is increased, the pilot stage plunger will be moved further to the right, the discharge opening in the pilot stage will again be opened, and the main stage plunger will be moved further to the left to increase the rate of flow through the motor 120.

When a signal is received by the transducer 90 to move the plunger 80 to the left, back to its neutral position of Fig. 7, as shown in solid lines in Fig. 8c from the position shown in dotted lines, the discharge passage 57 is opened and connected to passage 58 through annular passage 79 and hence is connected to chamber 43. This lowers the pressure in chamber 43, and since pressure in chamber 42 remains the same, a pressure differential is created which, as shown in Fig. 8d, shifts the plunger 30 to the right, returning that plunger to its neutral position, and blocking passages 71 and 73 to cut off the flow of fluid through the device 120 and terminate operation of that device. At the same time movement of the plunger 30 to the right moves sleeve 63 to the left, by virtue of link 95, and the sleeve 63 is returned to its neutral position, once again closing the pilot stage discharge opening.

In the operation described above, the control force moved the plunger 80 of the pilot stage to the left, to establish opening 71 in the main stage as the pressure outlet port, and then operated to move the plunger 80 back to its original position to terminate operation of the device. The control force may, in a similar manner, move the pilot stage plunger to the rgiht, originally, to establish opening 73 in the main stage as the pressure outlet port for reverse operation of the device, and then operate to return the plunger 80 to its original position to terminate operation of the device.

It will be noted that the capacity of the valve can be readily changed by replacing the link with one having a different fulcrum, thereby changing the linkage ratio between the main stage and pilot stage of the valve. If, for example, the fulcrum is moved toward the main stage, the capacity of the valve will be decreased since the sleeve will close the discharge opening in the pilot stage with less movement of the main stage plunger. Conversely, raising the fulcrum will increase the capacity of the valve.

Thus, it will be seen that with the construction of the present invention a sensitive stable valve has been provided which will operate effectively without high pressure in the pilot stage. Moreover, it should be noted that precision spaced spools are not required on the plunger in the pilot stage, thus facilitating manufacture thereof and assuring effective operation. It should also be noted that the response of the valve can be readily adjusted by changing the resistances in the discharge passages from the chambers. If these restrictions offer little resistance to flow, the pressures in the chambers will normally be only a slight amount above discharge pressure, and consequently the response of the valve, upon opening the additional discharge passage, will be slow. However, if greater resistances are used, and the pressures in the chambers are normally substantially above discharge pressure, the response will be rapid. Additionally, in the valve described herein, the capacity of the valve can be conveniently changed to suit the conditions of use.

What is claimed is:

1. A two-stage valve operable in response to a control force to supply fluid under pressure from a source comprising a main stage in communication with said source and having a pressure outlet port and a pair of chambers, means to discharge fluid from the source of fluid under pressure into said chambers and from said chambers, fixed resistances associated with said means to restrict the discharge of fluid into said chambers and from said chambers normally to establish equal predetermined pressure levels therein, a pilot stage in communication with each of said chambers and having a discharge opening, means responsive to the control force to connect one of said chambers to the pilot stage discharge opening and thereby produce a pressure differential between the chambers, and means responsive to said pressure differential to connect the source of fluid under pressure to the pressure outlet port of the main stage.

2. A two-stage valve operable in response to a control force to supply fluid under pressure from a source comprising: a main stage in communication with said source and having a pressure outlet port, a plunger movable to connect and disconnect the source of fluid under pressure and the pressure outlet port, and two chambers each in communication with one end of the plunger to move the same in response to a pressure drop in one chamber; a passage from said source to each of said chambers; a discharge passage from each of said chambers; a fixed resistance in each of said passages normally to establish equal predetermined pressure levels in said chambers; a pilot stage in communication with each of the chambers in the main stage and having a discharge opening; a plunger within the pilot stage movable alternately to close the discharge opening, to connect the discharge opening to one of said chambers, or to connect the discharge opening to the other of said chambers; means responsive to the control force to move the pilot stage plunger and connect the discharge opening to one of said chambers in the main stage and thereby produce a pressure drop in said chamber to move the main stage plunger and connect the source of fluid under pressure to the pressure outlet port; and means responsive to the movement of the main stage plunger to close the pilot stage discharge opening.

3. A two-stage valve operable in response to a control force to control a device operated by fluid under pressure from a source comprising: a main stage in communication with said source and the device and having a plunger within the main stage movable to connect and disconnect the source of fluid and the device, the main stage having two chambers each in communication with one end of the plunger to move the same in response to a pressure drop in one chamber; a passage from said source to each of said chambers; a discharge passage from each of said chambers; a fixed resistance in each of said passage normally to establish equal predetermined pressure levels in said chambers; a pilot stage having a movable sleeve with a discharge opening and an opening in communication with each of said chambers in the main stage and having a movable plunger received within the sleeve, the sleeve and the plunger being relatively movable alternately to close said discharge opening, to connect one of said chambers to the discharge opening, or to connect the other of said chambers to the discharge opening; means responsive to the control force to move the pilot stage plunger in relation to the sleeve and connect one of said chambers to the discharge opening to reduce the pressure in said chamber, thereby moving the main stage plunger to connect the device to the source of fluid under pressure; and a link connecting the main stage plunger to the pilot stage sleeve to move the sleeve relative to the pilot stage plunger in response to said movement of the main stage plunger and close the pilot stage discharge opening.

4. A two-stage electro-hydraulic valve operable in response to a control signal to supply pressure from a source comprising: a main stage in communication with the source of pressure and having a pressure outlet port and a plunger movable to connect and disconnect the source of pressure and the pressure outlet port, the main stage having two chambers each in communication with one end of the plunger to move the same in response to a pressure drop in one chamber, the main stage further having discharge passages connecting the source of pressure to said chambers and discharge passages from said chambers, each of said passage having a fixed restricted portion to define a pressure dropping resistance; a pilot stage having a movable sleeve with a discharge opening and an opening in communication with each of said chambers in the main stage and having a movable plunger received within the sleeve, the sleeve and the plunger being relatively movable alternately to close said discharge opening, to connect one of said chambers to the discharge opening, or to connect the other of said chambers to the discharge opening; an electro-mechanical transducer operatively connected to the pilot stage plunger to move the same in response to a control signal and connect one of said chambers to the discharge opening to reduce the pressure in said chamber thereby moving the main stage plunger to connect the pressure outlet port to the source of presusre; and a link connecting the main stage plunger to the pilot stage sleeve to move the sleeve relative to the pilot stage plunger in response to said movement of the main stage plunger and close the pilot stage discharge opening.

5. A two-stage electro-hydraulic valve operable in response to a control force to control a device operated by pressure from a source comprising: a main stage having a body with a pair of discharge openings, a pair of openings in communication with the device, an opening in communication with the source of supply, a plunger received within the body having a pair of end spools and intermediate spools to close the openings in communication with the device when the plunger is in one position and to connect one of said device openings with the source of pressure and to connect the other device opening to one of the discharge openings when the plunger is in a second position, the body and the end spools defining two chambers, a discharge passage through the plunger connecting the source of pressure to each chamber having fixed restrictions therein defining a pressure dropping resistance between the source and each chamber, and a discharge passage from each chamber having a fixed restricted portion defining a pressure dropping resistance; a pilot stage having a body with a movable sleeve therein, the sleeve having a discharge opening and a pair of openings each in communication with one of the chambers in the main stage, a plunger having a spool received in the sleeve and movable in relation to the sleeve alternately to block the discharge opening, to connect one of said chambers to said discharge opening, or to connect the other of said chambers to the discharge opening; an electro-mechanical transducer connected to the pilot stage plunger to move the same in relation to the sleeve in response to a control signal and thereby connect one of said chambers to the pilot stage discharge opening to reduce the pressure in the chamber and move the main stage plunger from said one position to said second position; and a link connecting the main stage plunger to the pilot stage sleeve to move the sleeve in relation to the pilot stage plunger and block the pilot stage discharge opening when the main stage plunger is moved to the second position.

References Cited in the file of this patent
UNITED STATES PATENTS

| | | |
|---|---|---|
| 1,985,589 | Ter Meer | Dec. 25, 1934 |
| 2,339,001 | Clay et al. | Jan. 11, 1944 |
| 2,582,088 | Walthers | Jan. 8, 1952 |
| 2,655,939 | Tauscher et al. | Oct. 20, 1953 |
| 2,655,940 | Jackson | Oct. 20, 1953 |
| 2,771,062 | Hayner | Nov. 20, 1956 |

FOREIGN PATENTS

| | | |
|---|---|---|
| 730,956 | Great Britain | June 1, 1955 |